United States Patent
Nunez Mencias et al.

(10) Patent No.: US 10,534,725 B2
(45) Date of Patent: *Jan. 14, 2020

(54) COMPUTER SYSTEM SOFTWARE/FIRMWARE AND A PROCESSOR UNIT WITH A SECURITY MODULE

(71) Applicant: International Business Machines Corporation, Armonk, NY (US)

(72) Inventors: Angel Nunez Mencias, Stuttgart (DE); Jakob C. Lang, Weil im Schoenbuch (DE); Martin Recktenwald, Schoenaich (DE); Ulrich Mayer, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 163 days.

This patent is subject to a terminal disclaimer.

(21) Appl. No.: 15/658,441

(22) Filed: Jul. 25, 2017

(65) Prior Publication Data

US 2019/0034356 A1    Jan. 31, 2019

(51) Int. Cl.
| | | |
|---|---|---|
| *G06F 21/00* | (2013.01) | |
| *G06F 12/14* | (2006.01) | |
| *G06F 13/24* | (2006.01) | |

(52) U.S. Cl.
CPC ......... *G06F 12/1408* (2013.01); *G06F 13/24* (2013.01); *G06F 2212/1052* (2013.01)

(58) Field of Classification Search
CPC .. G06F 9/3004; G06F 12/1009; G06F 9/3834; G06F 9/466; G06F 2009/45583
See application file for complete search history.

(56) References Cited

U.S. PATENT DOCUMENTS

| | | | |
|---|---|---|---|
| 9,231,923 B1 | 1/2016 | Cignetti | |
| 9,256,420 B2 | 2/2016 | Adler | |
| 9,432,183 B1 | 8/2016 | Axnix | |
| 2007/0014403 A1* | 1/2007 | Loo | H04N 5/765 380/201 |
| 2014/0281587 A1* | 9/2014 | Ignatchenko | G06F 21/64 713/193 |
| 2015/0371063 A1* | 12/2015 | Van Antwerpen | G06F 21/80 713/190 |
| 2016/0092243 A1 | 3/2016 | Boenisch | |
| 2016/0292085 A1 | 10/2016 | Axnix | |
| 2016/0292086 A1 | 10/2016 | Axnix | |

(Continued)

FOREIGN PATENT DOCUMENTS

| | | |
|---|---|---|
| CN | 103839001 A | 6/2014 |
| WO | 2015157690 A1 | 10/2015 |
| WO | 2019021153 A1 | 1/2019 |

OTHER PUBLICATIONS

"Secure Channels HSM", Secure Channels, Inc, <http://www.securechannels.com/products/56/secure-channels-hsm>, 3 pages, downloaded on Feb. 15, 2017 11:16 AM.

(Continued)

*Primary Examiner* — Ghazal B Shehni
(74) *Attorney, Agent, or Firm* — David B. Woycechowsky

(57) ABSTRACT

Technology for decrypting and using a security module in a processor cache in a secure mode such that dynamic address translation prevents access to portions of the volatile memory outside of a secret store in a volatile memory.

11 Claims, 5 Drawing Sheets

(56) References Cited

U.S. PATENT DOCUMENTS

2016/0292087 A1 10/2016 Axnix
2016/0292442 A1 10/2016 Axnix
2016/0342532 A1* 11/2016 Peacock .............. G06F 21/6218

OTHER PUBLICATIONS

"Virtual HSM", From OpenVZ Virtuozzo Containers Wiki, 7 pages, This page was last modified on Apr. 27, 2014, at 18:24, 7 pages.
Nunez Mencias et al., "A Computer System Software/Firmware and a Processor Unit With a Security Module", U.S. Appl. No. 15/806,440, filed Nov. 8, 2017.
List of IBM Patents or Patent Applications Treated as Related, Filed Nov. 8, 2017, 2 pages.
International Search Report and Written Opinion, International Application No. PCT/IB2018/055462, International Filing Date Jul. 23, 2018.

* cited by examiner

COMPUTER SYSTEM SOFTWARE/FIRMWARE AND A PROCESSOR UNIT WITH A SECURITY MODULE

BACKGROUND

The present invention relates to security modules (SMs) used for performing encrypted related operations (for example, encryption of target data, decryption of target data, key management).

A hardware security module (HSM) is a physical computing device that safeguards and manages digital keys for strong authentication and provides crypto processing. These modules traditionally come in the form of a plug-in card or an external device that attaches directly to a computer or network server. HSMs may possess controls that provide tamper evidence such as logging and alerting and tamper resistance such as deleting keys upon tamper detection. Each module contains one or more secure crypto processor chips to prevent tampering and bus probing.

Many HSM systems have means to securely backup the keys they handle either in a wrapped form via the computer's operating system or externally using a smartcard or some other security token. Because HSMs are often part of a mission-critical infrastructure such as a public key infrastructure or online banking application, HSMs can typically be clustered for high availability. Some HSMs feature dual power supplies and field replaceable components such as cooling fans, to conform to the high-availability requirements of data center environments and to enable business continuity.

Few of the HSMs have the ability to execute specially developed modules within the HSM's secure enclosure. Such an ability is useful, for example, in cases where special algorithms or business logic have to be executed in a secured and controlled environment. The modules can be developed in native C language, in .NET, Java, or other programming languages. While providing the benefit of securing application-specific code, these execution engines obey an HSM's Federal Information Processing Standard (FIPS) or Common Criteria validation.

A hardware security module can be employed in any application that uses digital keys. Typically, the keys must be of high-value, meaning there would be a significant, negative impact to the owner of the key if it were compromised. The functions of an HSM are: (i) onboard secure cryptographic key generation; (ii) onboard secure cryptographic key storage and management; (iii) use of cryptographic material; and (iv) use of sensitive data material; and (v) offloading application servers for complete asymmetric and symmetric cryptography. HSM are also deployed to manage Transparent Data Encryption keys for databases. HSMs provide both logical and physical protection of these materials, including cryptographic keys, from non-authorized use and potential adversaries. The cryptographic material handled by most HSMs are asymmetric key pairs (and certificates) used in public-key cryptography. Some HSMs can also handle symmetric keys and other arbitrary data.

Physical HSMs are very expensive to produce. Further, HSMs are dedicated to virtual machines (or at least one of a fixed amount of domains). Thus, if there are a lot of virtual machines in a mainframe computer system there may be not enough physical HSMs to cover all virtual machines, but privacy/security requirements still apply. In currently conventional HSMs, encrypted memory mechanisms may be used for crypto processing. Besides using HSMs, certain commercially-available cryptographic accelerators or a plastic card with a built-in microprocessor, used typically for electronic processes such as financial transactions and personal identification may be used. Mechanisms known as Central Processor Assist for Cryptographic Function (CPACF) or network HSMs, like certain commercially available information security solutions may be used for these purposes.

Further, a so-called Virtual HSM (VHSM) being a software suite for storing and manipulating secret data outside a virtualized application environment may be used. While a HSM is a physical device connected to the computer, this software provides HSM functionality through an application programming interface (API) in a virtual environment based on the Linux-based OpenVZ container technology.

The architecture of the virtual HSM consists of the following key components: (i) a VHSM virtual environment (VHSM VE) is the isolated environment that contains the VHSM server and secure storage. The server performs operations on secret data and storage keeps encrypted user data. Further a transport layer, where transport exchanges data between client and server virtual environments, is based on: (i) the Linux-based Netlink socket technology; and (ii) a client virtual environment, with a client API and accompanying utilities for accessing the VHSM server from a client environment.

Further in the art, there is a certain commercially-available set of CPU (central processing unit) code instructions that allows user-level code to allocate private regions of memory, called enclaves. Unlike normal process memory, "enclaves" are protected from processes running at higher privilege levels.

Support for the CPU instructions mentioned in the foregoing paragraph in the CPU is indicated in a CPUID command "Structured Extended Feature Leaf", EBX bit 02, but its availability to applications requires BIOS (Basic Input/Output System) support and opt-in enabling which is not reflected in CPUID bits. The CPU instructions mentioned in the foregoing paragraph are based on a special trusted memory, in other words, processor reserved memory. Further code is sent to the machine as plain text.

SUMMARY

A computer system software with a security module is proposed, the security module having a secret store for secret data and an interface for operating systems to interact with the security module, the security module stored encrypted with a public key in a memory of a computer system, and the computer system comprising at least one processor with at least one processor cache, wherein, in response to an access to the interface, the software is performing (i) switching the processor of the computer system to a secure mode; (ii) disabling a write operation of program code and data of the security module from the processor cache to the memory; (iii) decrypting the program code and/or data of the security module in the processor cache with a secret key; (iv) configuring dynamic address translation to prevent access to the memory outside of the areas used by the security module; (v) executing the program code of the security module with data provided on the interface; (vi) encrypting the data in the processor cache with the public key; (vii) enabling the write operation of program code and data of the security module from the processor cache to the memory; and (viii) switching the processor to a normal operating system mode.

Advantageously the inventive software with a security module allows to emulate a virtual hardware security module in software, firmware and/or hardware. As such an emulated security module may not be tampered, there is no need to trust a system administrator. Customers are allowed to program their own virtual security modules, populate the security modules with their own secrets or certificates and deploy them on remote systems in emulated security modules. Software/Hardware secures the memory and/or interfaces of the virtual security module by encrypting the content of the security module and limitation of read access processes. The decrypted security module, including internal information, never leaves the processor unit chip. The interface of the security module enables operating systems to manage and in particular enables operating systems to retrieve the content of the secret store in an encrypted state only. Writing program code from the processor cache to the memory might particularly concern self-modifying code.

According to an embodiment the write operation to the memory may be disabled for data tagged with a non-secure flag. Using the non-secure flag enables favourably to distinguish between data being allowed to leave the processor chip or not.

According to an embodiment the processor cache may comprise at least first level caches and second level caches. Processors with different level caches advantageously allow to control availability of programs or data with different attributes for disabling access to specific programs or data.

According to an embodiment the interface to the security module may be implemented as an application programming interface using a crypto architecture. By this way, a customer may program his own security module guaranteeing a high security for his private data.

According to an embodiment, execution of the security module may be suspended during an interrupt request to the processor, and the security module may be encrypted before passing control to an interrupt handling program. Thus, favourably, access to decrypted private data of the security module may be prevented.

According to an embodiment, the security module may be restarted after termination of the interrupt request. By this way reliable functioning of the security module can be achieved even after interruption by an interrupt request.

According to an embodiment the security module may be restarted after controlled abortion of the security module. By this way reliable functioning of the security module can be achieved even after interruption by an interrupt request.

According to an embodiment the security module being shared between multiple programs may use a semaphore mechanism to serialize access to the area of the memory used by the security module. Thus, correct use of the same memory regions and/or data by different programs can be achieved in a synchronized manner without the risk of destroying data of one program by another program.

According to an embodiment, on executing a thread in a multithreading process on the processor, multithreading may be disabled during execution of the security module. By this way, the problem of losing cache lines of the security module by aging out and/or accessing decrypted data by other threads may be avoided if the processor is sharing caches between threads.

According to an embodiment cache lines may be tagged with non-secure flags for blocking a cache line access to other threads and/or cache lines may be prevented from being purged or aged-out by other threads. Thus, cache access by unauthorized threads may be avoided even with multithreading enabled in a processor sharing caches between threads.

According to an embodiment, on executing a thread in a multithreading process on the processor, cache sharing between threads may be disabled during execution of the security module and cache lines may be purged before restarting multithreading. By this way, the problem of losing cache lines of the security module by aging out and/or accessing decrypted data by other threads may be avoided.

Further a computer system firmware is proposed with software implemented as described above. Implementing the software system with an emulated security module may additionally increase the security level of a computer system in an advantageous way.

Further a processor unit is proposed for implementing a security module in a software, with at least one processor comprising at least one processor cache, the processor unit comprising at least another cache, the security module having a secret store for secret data and an interface for operating systems to interact with the security module, the security module stored encrypted with a public key in a memory of a computer system, wherein the processor is configured to, in response to an access to the interface, (i) if being switched to a secure mode disabling a write operation of program code and data of the security module from the caches to the memory; (ii) decrypting the program code and/or data of the security module in the processor cache with a secret key; (iii) configuring dynamic address translation to prevent access to the memory outside of the areas used by the security module; (iv) executing the program code of the security module with data provided on the interface; (v) encrypting the data in the processor cache with the public key; and (vi) if being switched to a normal operating system mode enabling the write operation of program code and data of the security module from the processor cache to the memory.

Advantageously the inventive processor unit for implementing a security module in a software allows to emulate a hardware security module in software, firmware and/or hardware. As such an emulated security module may not be tampered, there is no need to trust a system administrator. Customers are allowed to program their own virtual security modules, populate the security modules with their own secrets or certificates and deploy them on remote systems in emulated security modules. Software/Hardware secures the memory and/or interfaces of the virtual security module by encrypting the content of the security module and limitation of read access processes. The decrypted security module, including internal information, never leaves the processor unit chip. The interface of the security module enables operating systems to manage and retrieve the content of the secret store in an encrypted state only.

According to an embodiment the write operation to the memory may be disabled for data tagged with a non-secure flag. Using the non-secure flag enables favourably to distinguish between data being allowed to leave the processor chip or not.

According to an embodiment the processor may comprise at least first level caches and second level caches, and the processor unit may comprise at least a third level cache, wherein a program code and/or data of the security module may be unencrypted when used in the first and/or second level caches and in the third level cache. Processors with different level caches advantageously allow to control availability of programs or data with different attributes for disabling access to specific programs or data.

According to an embodiment the program code and/or data of the security module may be encrypted when leaving the processor unit. By this way, a high privacy may be guaranteed to the customer data encoded in the security module, as well as data accessed by a customer program via the interface using the security module.

According to an embodiment, on performing a cross interrogate process on the memory, a semaphore mechanism may be used to serialize access to the area of the memory shared between processes. Thus, favourably memory coherency may be maintained if multiple processes sharing security modules try to use cache lines of security modules from each other.

According to an embodiment, on performing a transactional memory, a semaphore mechanism may be used to serialize access to the area of the memory shared between processes. Thus, favourably memory coherency may be maintained if multiple processes sharing security modules try to use cache lines of security modules from each other.

According to an embodiment, during an interrupt request to the processor, execution of the security module may be suspended and the security module may be encrypted before passing control to an interrupt handling program. Thus, favourably, access to decrypted private data of the security module may be prevented.

According to an embodiment the security module may be restarted after termination of the interrupt request. By this way reliable functioning of the security module can be achieved even after interruption by an interrupt request.

According to an embodiment the security module may be restarted after controlled abortion of the security module. By this way reliable functioning of the security module can be achieved even after interruption by an interrupt request.

According to an embodiment, on executing a thread in multithreading on the processor, multithreading may be disabled during execution of the security module. By this way, the problem of losing cache lines of the security module by aging out and/or accessing decrypted data by other threads may be avoided if the processor is sharing caches between threads.

According to an embodiment cache lines may be tagged with non-secure flags for blocking a cache line access to other threads and/or cache lines may be prevented from being purged or aged-out by other threads. Thus, cache access by unauthorized threads may be avoided.

According to an embodiment, on executing a thread in multithreading on the processor, a cache sharing between threads may be disabled during execution of the security module and cache lines may be purged before restarting multithreading. By this way, the problem of losing cache lines of the security module by aging out and/or accessing decrypted data by other threads may be avoided.

When multithreading is allowed while a security module is active another thread might load cache lines and by this replace cache lines currently tagged non-secure. Such situations can either be handled similarly to cross interrogates or cache lines with the NS-flag set might be protected from being replaced by the other thread, thus being protected from aging out.

Further a favourable method is proposed for implementing a security module in a computer system software, the security module having a secret store for secret data and an interface for operating systems to interact with the security module, the security module stored encrypted with a public key in a memory of the computer system, and the computer system comprising at least one processor with at least one processor cache, wherein, in response to an access to the interface, the method comprising software operations: (i) switching the processor of the computer system to a secure mode; (ii) disabling a write operation of program code and data of the security module from the processor cache to the memory; (iii) decrypting the program code and/or data of the security module in the processor cache with a secret key; (iv) configuring dynamic address translation to prevent access to the memory outside of the areas used by the security module; (v) executing the program code of the security module with data provided on the interface; (vi) encrypting the data in the processor cache with the public key; (vii) enabling the write operation of program code and data of the security module from the processor cache to the memory; and (viii) switching the processor to a normal operating system mode.

Advantageously the inventive software with a security module allows to emulate a hardware security module in software, firmware and/or hardware. As such an emulated security module may not be tampered, there is no need to trust a system administrator. Customers are allowed to program their own virtual security modules, populate the security modules with their own secrets or certificates and deploy them on remote systems in emulated security modules. Software/Hardware secures the memory and/or interfaces of the virtual security module by encrypting the content of the security module and limitation of read access processes. The decrypted security module, including internal information, never leaves the processor unit chip. The interface of the security module enables operating systems to manage and in particular enables operating systems to retrieve the content of the secret store in an encrypted state only.

According to an embodiment the write operation to the memory may be disabled for data tagged with a non-secure flag. Using the non-secure flag enables favourably to distinguish between data being allowed to leave the processor chip or not.

Further a favourable computer program product is proposed for implementing a security module in a computer system software, the security module having a secret store for secret data and an interface for operating systems to interact with the security module, the security module stored encrypted with a public key in a memory of the computer system, and the computer system comprising at least one processor with at least one processor cache, the computer program product comprising a computer readable storage medium having program instructions embodied therewith, the program instructions executable by a computer to cause the computer, in response to an access to the interface, to perform a method comprising software operations: (i) switching the processor of the computer system to a secure mode; (ii) disabling a write operation of program code and data of the security module from the processor cache to the memory; (iii) decrypting the program code and/or data of the security module in the processor cache with a secret key; (iv) configuring dynamic address translation to prevent access to the memory outside of the areas used by the security module; (v) executing the program code of the security module with data provided on the interface; (vi) encrypting the data in the processor cache with the public key; (vii) enabling the write operation of program code and data of the security module from the processor cache to the memory; and (viii) switching the processor to a normal operating system mode.

According to an embodiment the write operation to the memory may be disabled for data tagged with a non-secure flag. Using the non-secure flag enables favourably to distinguish between data being allowed to leave the processor chip or not.

Further a favourable data processing system with at least one processor unit with at least one processor, for execution of a data processing program is proposed, comprising computer readable program instructions for implementing a security module in a computer system software, the security module having a secret store for secret data and an interface for operating systems to interact with the security module, the security module stored encrypted with a public key in a memory of a computer system, wherein, in response to an access to the interface, the software performing, (i) switching the processor of the computer system to a secure mode; (ii) disabling a write operation of program code and data of the security module from the processor cache to the memory; (iii) decrypting the program code and/or data of the security module in the processor cache with a secret key; (iv) configuring dynamic address translation to prevent access to the memory outside of the areas used by the security module; (v) executing the program code of the security module with data provided on the interface; (vi) encrypting the data in the processor cache with the public key; (vii) enabling the write operation of program code and data of the security module from the processor cache to the memory; and (viii) switching the processor to a normal operating system mode.

According to an embodiment the write operation to the memory may be disabled for data tagged with a non-secure flag. Using the non-secure flag enables favourably to distinguish between data being allowed to leave the processor chip or not.

According to an embodiment there is a method, computer program product and/or system for use with a security module including program instructions for providing a secret store in a volatile memory for secret data and an interface for interacting with an operating system that performs the following operations (not necessarily in the following order): (i) storing, in a processor cache of a processor, data constituting the security module in an encrypted form that can be decrypted by a secret key; (ii) switching the processor to a secure mode; (iii) responsive to the switching to the secure mode, disabling a write operation, with the write operation being an operation that writes the data constituting the security module from the processor cache to a volatile memory; (iv) decrypting, in the processor cache, the data constituting the security module with the secret key; (v) configuring dynamic address translation to prevent access to portions of the volatile memory outside of the secret store; (vi) receiving data through the interface of the security module; (vii) encrypting, by the security module and in the processor cache, the data received through the interface of the security module using a public key; (viii) enabling the write operation; and (ix) switching the processor to a normal operating system mode.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

Figure 1:
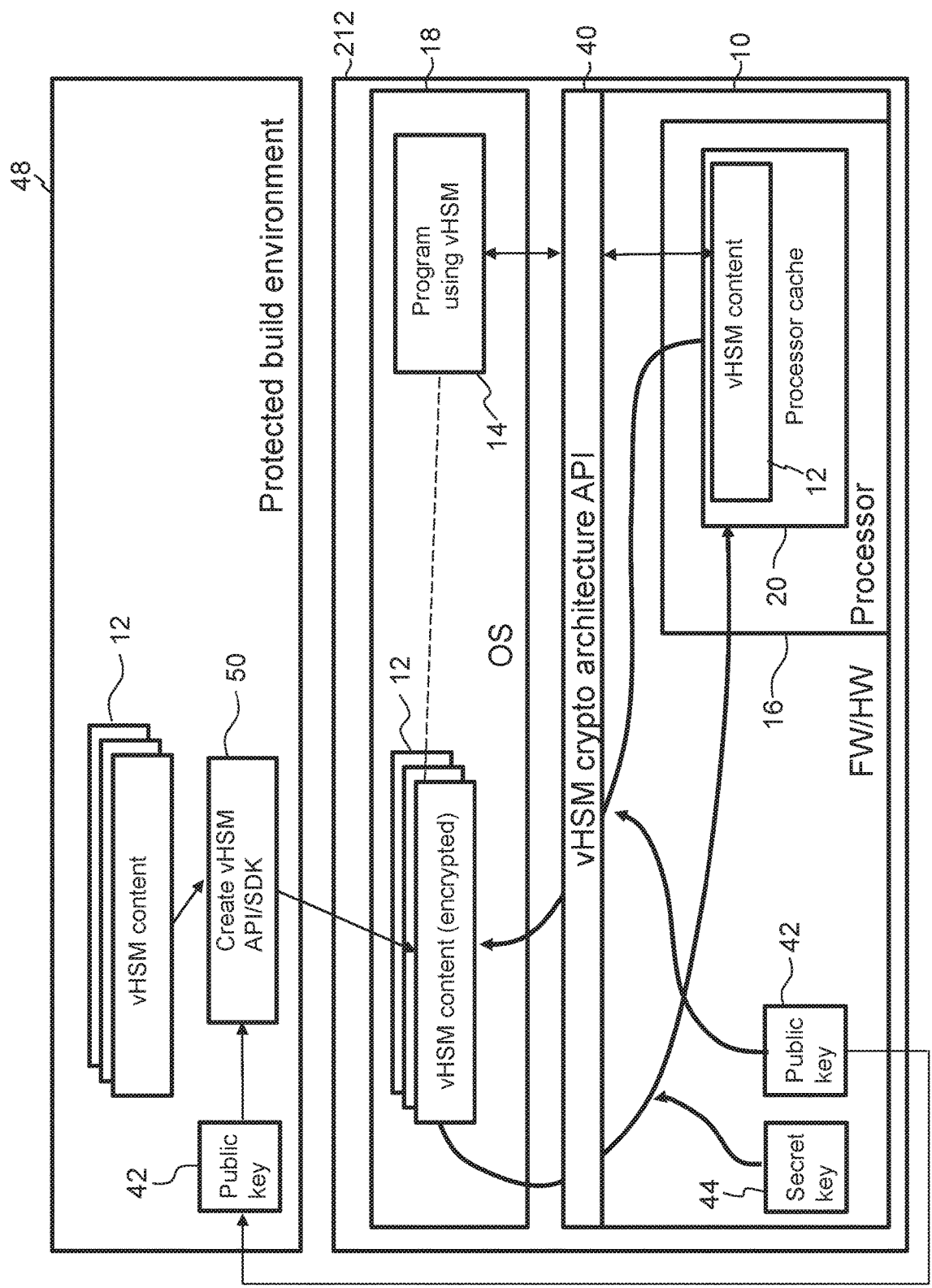
FIG. 1 depicts a block diagram of an implementation of a security module on a computer system software according to an embodiment of the invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

As mentioned, above, in the Background section, there is a certain commercially-available set of CPU (central processing unit) code instructions that allows user-level code to allocate private regions of memory, called enclaves. Some embodiments of the present invention may recognize that this may: (i) add complication for feature detection of applications (because of the use of CPUID); and/or (ii) raise security issues (because of information sent as plain text).

The illustrative embodiments provide a computer system software with: (i) a security module, the security module having a secret store for secret data and an interface for operating systems to interact with the security module; (ii) the security module stored encrypted with a public key in a memory of a computer system and (iii) the computer system includes at least one processor with at least one processor cache.

The illustrative embodiments are sometimes described herein using particular technologies only as an example for the clarity of the description. The illustrative embodiments may be used for an access to the interface, the software performing: (i) switching the processor of the computer system to a secure mode; (ii) disabling a write operation of program code and data of the security module from the processor cache to the memory; (iii) decrypting the program code and/or data of the security module in the processor cache with a secret key; (iv) configuring dynamic address translation to prevent access to the memory outside of the areas used by the security module; (v) executing the program code of the security module with data provided on the interface; (vi) encrypting the data in the processor cache with the public key; (vii) enabling the write operation of program code and data of the security module from the processor cache to the memory; and (viii) switching the processor to a normal operating system mode.

FIG. 1 depicts a block diagram of an implementation of a security module 12, denoted as virtual hardware security module (vHSM), on a computer system software according to an embodiment of the invention. The software for implementing the security module 12 may also be implemented in the firmware 10 of the computer system 212.

The computer system 212 in FIG. 1 includes at least one processor 16, with at least one processor cache 20, the processor 16 running in a firmware/hardware (FW/HW) environment 10, with an interface 40. The interface 40 to the security module 12 is implemented as an application programming interface using a crypto architecture. The processor cache 20 may include at least first level caches 22, 24 and second level caches 26, 28 as shown, for example, in FIG. 2. The computer system 212 further includes memory 18, where program 14, operated by an operating system OS, may be executed.

The security module 12 has a secret store for secret data and may be created using a software development kit (SDK) 50 in a protected build environment 48 by a customer. The security module 12 is stored encrypted with a public key 42 in the memory 18 of the computer system 212 by request of the program 14. The public key 42 is the public part of a certificate and available to the customer. The security module 12 is encrypted by this public key 42 and sent to the computer system 212. The program code of the security module 12 implements the interface 40 described by a crypto architecture. The interface 40 serves for the operating system to interact with the security module 12 in order to manage and retrieve the content of the secret store of the security module 12 in an encrypted state.

Accessing interface 40 by program 14, reference to an address of the security module 12, as well as memory pointers to input/output areas of the memory 18, are passed to the interface 40. The processor 16 of the computer system 212 is switched to a secure mode by the software. A write operation of data, from the processor cache 20 to the memory 18, by a program code of the security module 12, is disabled for data tagged with a non-secure flag. The program code and/or data of the security module 12 is decrypted in the processor cache 20 with the secret key 44. Dynamic address translation is reconfigured to prevent access to the memory 18, outside of the areas used by the security module 12, but access to input/output areas of the security module 12, whose memory pointers were passed before, is still allowed. The software triggers the execution of the security module 12 with the passed parameters. The program code of the security module 12 is executed with data provided on the interface 40. Then, an instruction for leaving the security module mode is executed by the program code of the security module 12. The data is encrypted by the software in the processor cache 20 with the public key 42. The write operation of data from the processor cache 20, to the memory 18, for the program code of the security module 12 is re-enabled by the software Encrypted data is written back to the memory 18 and the processor 16 is switched back to a normal operating system mode by the software. The program 14 retrieves the result of the security module operation and continues its normal execution.

Figure 2:
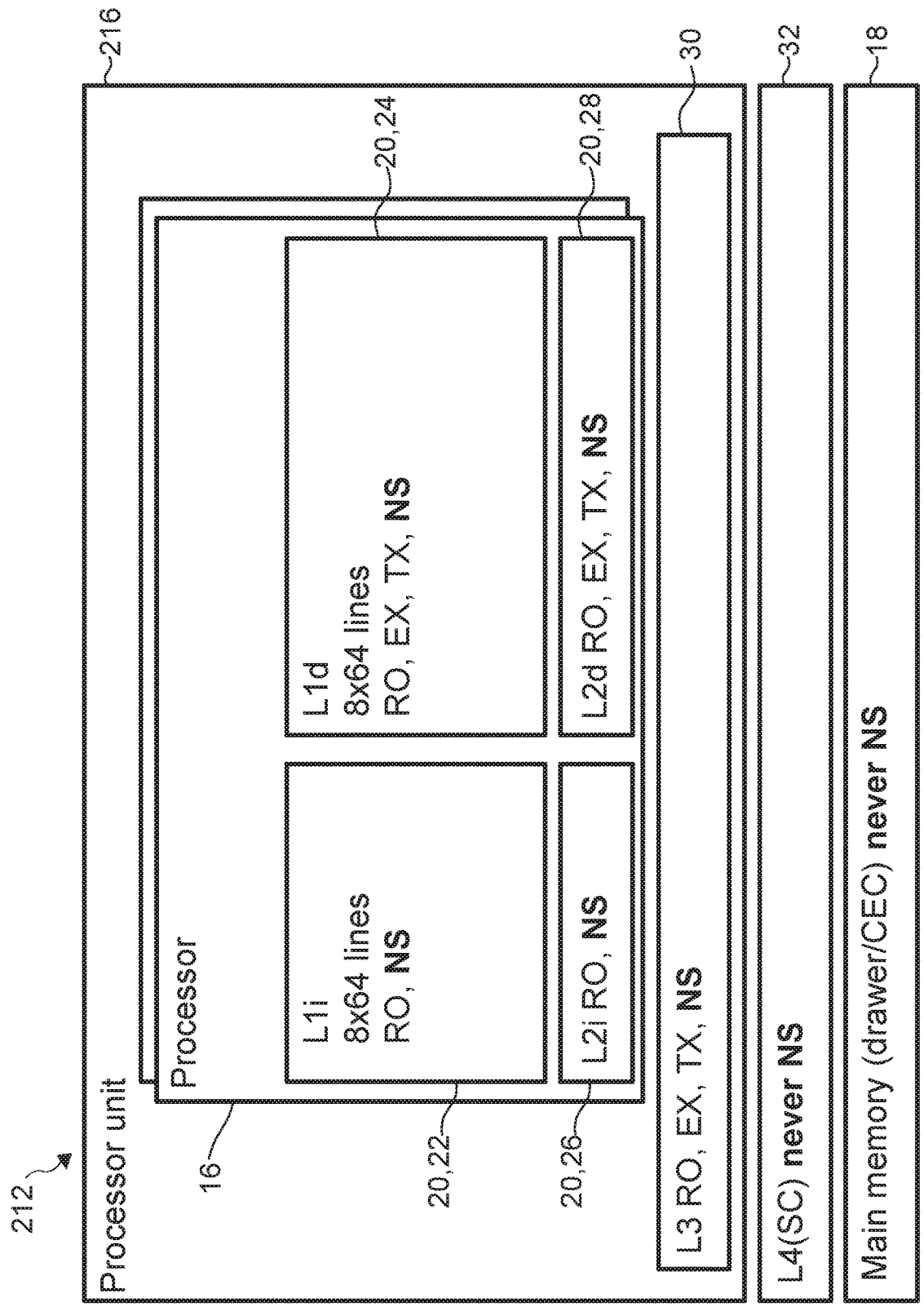
FIG. 2 depicts a cache and memory hierarchy of a computer system with a security module according to an embodiment of the invention.

FIG. 2 depicts a cache and memory hierarchy of a computer system 212 with a security module according to an embodiment of the invention. The processor unit 216, as part of the computer system 212, serves for implementing a security module in software, with at least one processor 16, including at least processor caches 20, 22, 24, 26, 28, and the processor unit includes at least another cache 30. The processor 16, shown in the embodiment in FIG. 2, includes two first level caches 22, 24 (L1i as an instruction cache and L1d as a data cache) and two second level caches 26, 28, (L2i as an instruction cache and L2d as a data cache). The processor unit 216 further includes a third level cache 30 (L3). The computer system 212 in the embodiment in FIG. 2 also includes a fourth level cache 32 (L4) and main memory 18. Cache lines typically have a length of 256 bytes. Level one caches 22, 24, 26, 28 of the embodiment, for example, include 8×64-bit cache lines. The instruction caches 22 and 26 are generally configured as read-only (RO), whereas content of the data caches 24 and 28, as well as the level three cache 30, may be flagged as: (i) read-only (RO); (ii) exclusive (EX) or (iii) transactional memory (TX). The level four cache 32 is related to a system controller (SC).

Advantageously, a program code and/or data of the security module are unencrypted when used in the first and/or second level caches 22, 24, 26, 28 and in the third level cache 30. This is achieved by tagging the program code and/or the data by a non-secure flag (NON-SECURE=NS). Program code and/or data is encrypted when leaving the processor unit 216, thus the level four cache 32, as well as the memory 18, only receive program code and/or data tagged as secure (never NS).

From a performance point of view, the amount of cache lines which can reside within the processor chip 16 does matter. Hence, the NS flag/tag is used on cache levels one, two and three.

There is also a distinction between instruction and data handling. Data naturally needs to be stored, and hence the security module typically ensures that decrypted data is not drained. This is also achieved by the NS flag. Non-secure data may not be written back, or written through, beyond chip cache levels. Instructions are usually fetched read-only. However, depending on where the encrypting/decrypting operation occurs (for example on the boundary between L1 and L2 versus on the boundary between L2 and L3), decrypted instruction cache lines may write through from L1 to L2.

Instruction caches 22 and 26 get the non-secure cache lines pushed from the data caches 24 and 28. On abortion, the non-secure cache lines are purged from data caches 24 and 28 as well as instruction caches 22 and 26. Data marked as non-secure in the level three cache 30 never leave the processor unit 216, but are first encrypted before leaving the processor unit 216.

On performing a cross interrogate process (XI), as part of memory coherency mechanisms, the cross interrogate process removes the cache line from cache 22, 24, 26, 28 and 30 wherein the cache line may be decrypted. As the cross interrogates must not be kept or rejected, because of a potential failure of the system, the security module serves as a hardware extension to the cache memory. A state, for example, DO NOT STORE, is added to the cache lines in the caches, wherein the same cache line may be encrypted or decrypted in the cache.

The XI may remove an unchanged NS-flagged cache line, which would just be re-fetched. Then no special action is required, or the XI may remove a modified cache line, which must have been fetched exclusively. This might result in different options.

If the security module (vHSM) stores have already occurred since invocation of the security module, the XI processing may be delayed until the cache line can be stored. If the vHSM has been naturally completed, changes get stored, and the XI response gets sent. If the vHSM operation gets stopped at an interruptible point, changes get stored, and the XI response gets sent.

If no vHSM stores have occurred since invocation, then the vHSM operation might be aborted/nullified. All modified vHSM data may then be discarded and the XI response gets sent.

When sharing the security module between multiple processes, the cross interrogate processes might take the cache lines from each other process. The security module operations may then abort. As a forward process is not guaranteed, a semaphore mechanism is used to serialize access to the area of the memory 18, shared between processes. Forward progress escalations get triggered in such situations.

This mechanism is similar to performing a transactional memory operation wherein a semaphore mechanism may be used to serialize access to the area of the memory 18, shared between processes. In this context forward progress escalations also get triggered.

When multithreading is allowed, and a security module is active, another thread might load cache lines and replace cache lines currently flagged NS. Such situations can either be handled similarly to cross interrogates, or cache lines with the NS-flag set, and/or might be protected from being replaced by the other thread, thus being protected from aging out.

Figure 3:
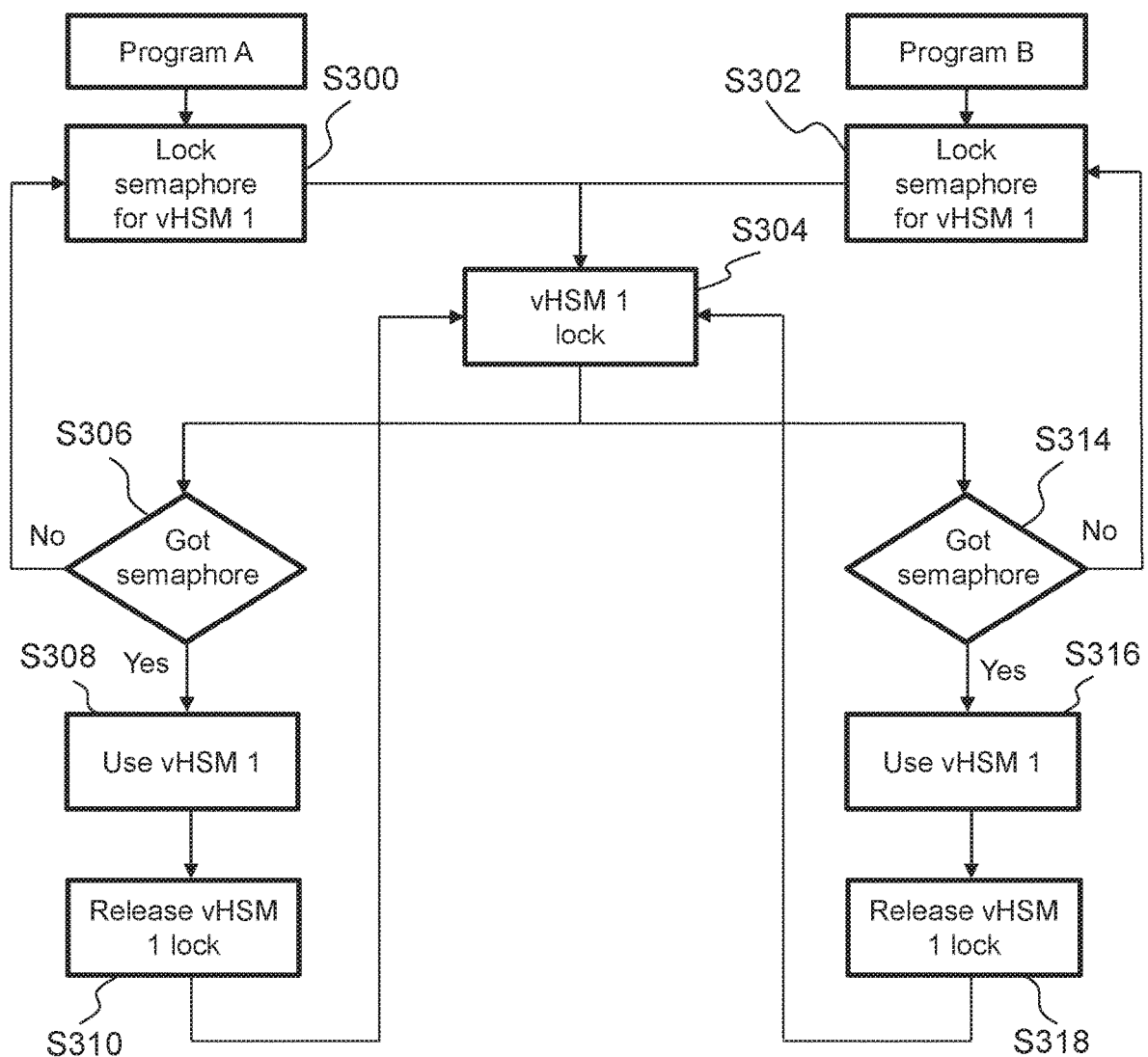
FIG. 3 depicts a flow diagram for using a shared security module by two programs restricting access with a semaphore locking mechanism according to an embodiment of the invention.

FIG. 3 depicts a flow diagram for using a shared security module (vHSM) by two programs A and B, restricting access with a semaphore locking mechanism according to an embodiment of the invention.

According to FIG. 3, the security module may be shared between multiple programs using a semaphore mechanism to serialize access to the area of the memory used by the security module. Before using the security module, program A and B will try to lock the security module for them in operations S300 and S302. If either of them got the semaphore, meaning to lock the security module in operation S304, and which is checked in operations S306 and S314, either of them uses the security module in operations S308 and 316. The program which did not get the semaphore then goes back to trying to lock the security module in operations S300 and S302. After successfully using the security module, it may be released by the program that was using it in operations S310 and S318. Thus, the security module is free to being used by the other program in operation S304.

An interrupt might give control to a different program, which is not supposed to access a decrypted memory area of the security module. Advantageously, access to the level one caches of the processor unit with the appropriate address may provide this memory access. As there is a need to act in time on interrupt requests, the security module may ensure forward progress escalations and therefore tracks the state internally. Thus, the software may encrypt the security module before branching to the interrupt code. During an interrupt request to the processor, execution of the security module is suspended, and the security module is encrypted before passing control to the interrupt handling program. After termination of the interrupt request, the security module is restarted. Thus, the security module may be restarted after controlled abortion of the security module.

During execution of a thread in a multithreading process on the processor, multithreading may be disabled during execution of the security module. If the processor is running other thread caches, cache lines of the security module might be lost due to aging out, or other threads might access decrypted data of the security module.

There are two options to deal with keeping decrypted cache lines hidden from other threads: (i) turn off multithreading and purge the cache before turning multi-threading on again; or (ii) tag each cache line with a non-secure flag, which can be used in the cache access hit compare logic, to match only the thread allowed to be accessed. Software may be used to set-up the non-secure flags or execute the purge cache accordingly. This may be achieved by tagging cache lines with non-secure flags for blocking a cache line access to other threads, and/or preventing cache lines from being purged, or aged-out, by other threads.

Alternatively, cache sharing between threads may be disabled during execution of the security module, and cache lines may be purged before restarting multithreading.

Figure 4:
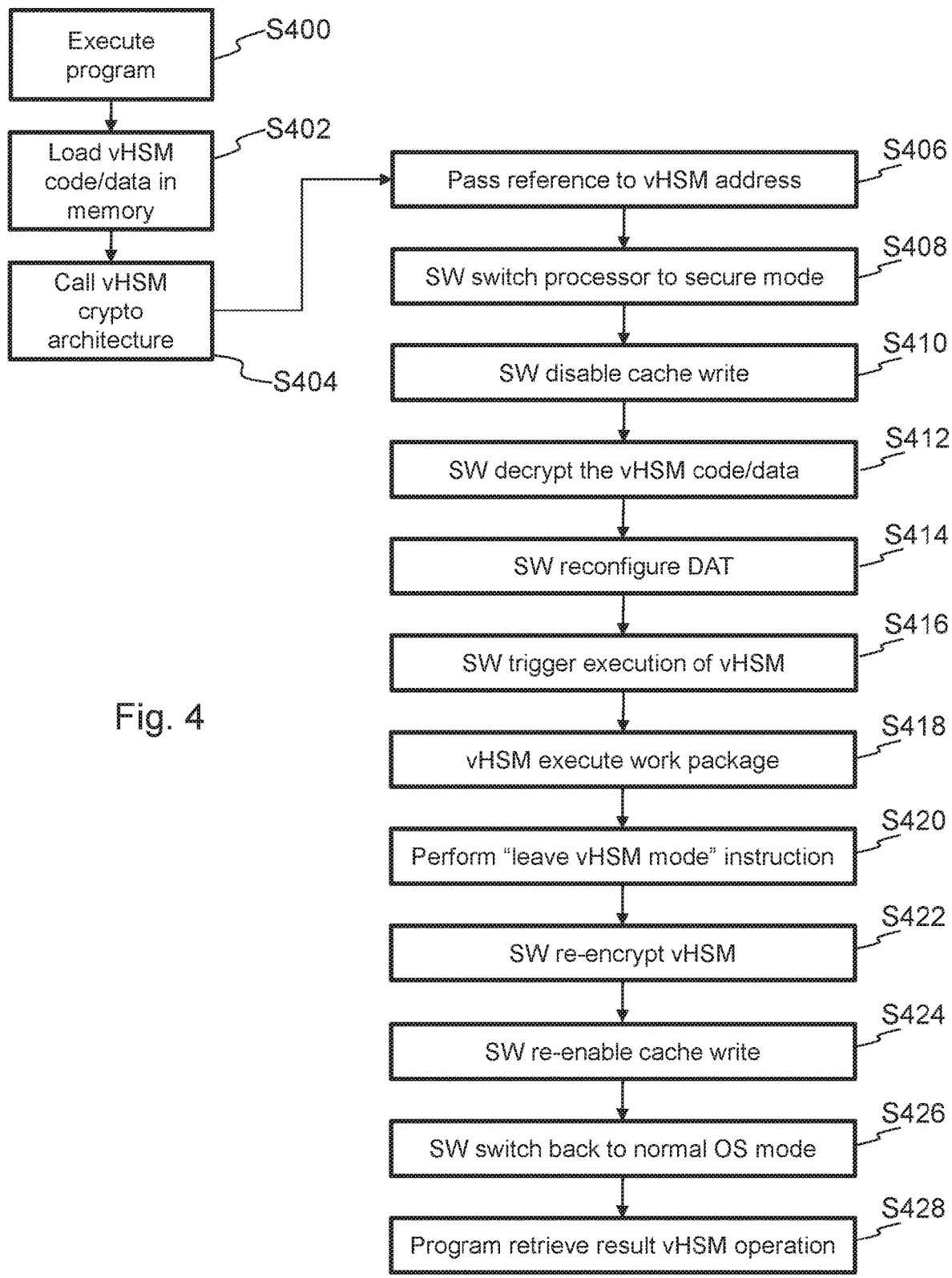
FIG. 4 depicts a flowchart for using a security module implemented on a computer system software according to an embodiment of the invention.

FIG. 4 depicts a flowchart for using a security module implemented on a computer system software according to an embodiment of the invention. Thus, the method for implementing the security module in the software may also be understood in detail.

If a program executing on a computer system in operation S400 requires the operation of the security module, the program code and/or data of the security module, or parts of it, is loaded into memory in operation S402. Accessing the interface with the crypto architecture by the program, operation S404, references an address of the security module, as well as memory pointers to input/output areas of the memory. This information is then passed to the interface in operation S406. The processor of the computer system is switched to a secure mode by the software in operation S408. Next, in operation S410, a write operation of data from the processor cache to the memory, by a program code of the security module, is disabled for data tagged with a non-secure flag. The program code and/or data of the security module is decrypted in the processor cache with the secret key in operation 412. Dynamic address translation (DAT) is reconfigured in operation S414 to prevent access to the memory outside of the areas used by the security module, but access to input/output areas of the security module, whose memory pointers were passed before, is still allowed. The software triggers the execution of the security module with the passed parameters in operation S416, followed by executing the program code of the security module with data provided on the interface in operation S418. An instruction for leaving the security module mode is then executed by the program code of the security module in operation S420. In operation S422, the data is encrypted by the software in the processor cache with the public key. The write operation of data from the processor cache to the memory, for the program code of the security module, is re-enabled by the software in operation S424. Encrypted data is written back to the memory and the processor is switched back to a normal operating system mode by the software in operation S426. The program may retrieve the result of the security module operation from the input/output areas and continue its normal execution in operation S428.

Figure 5:
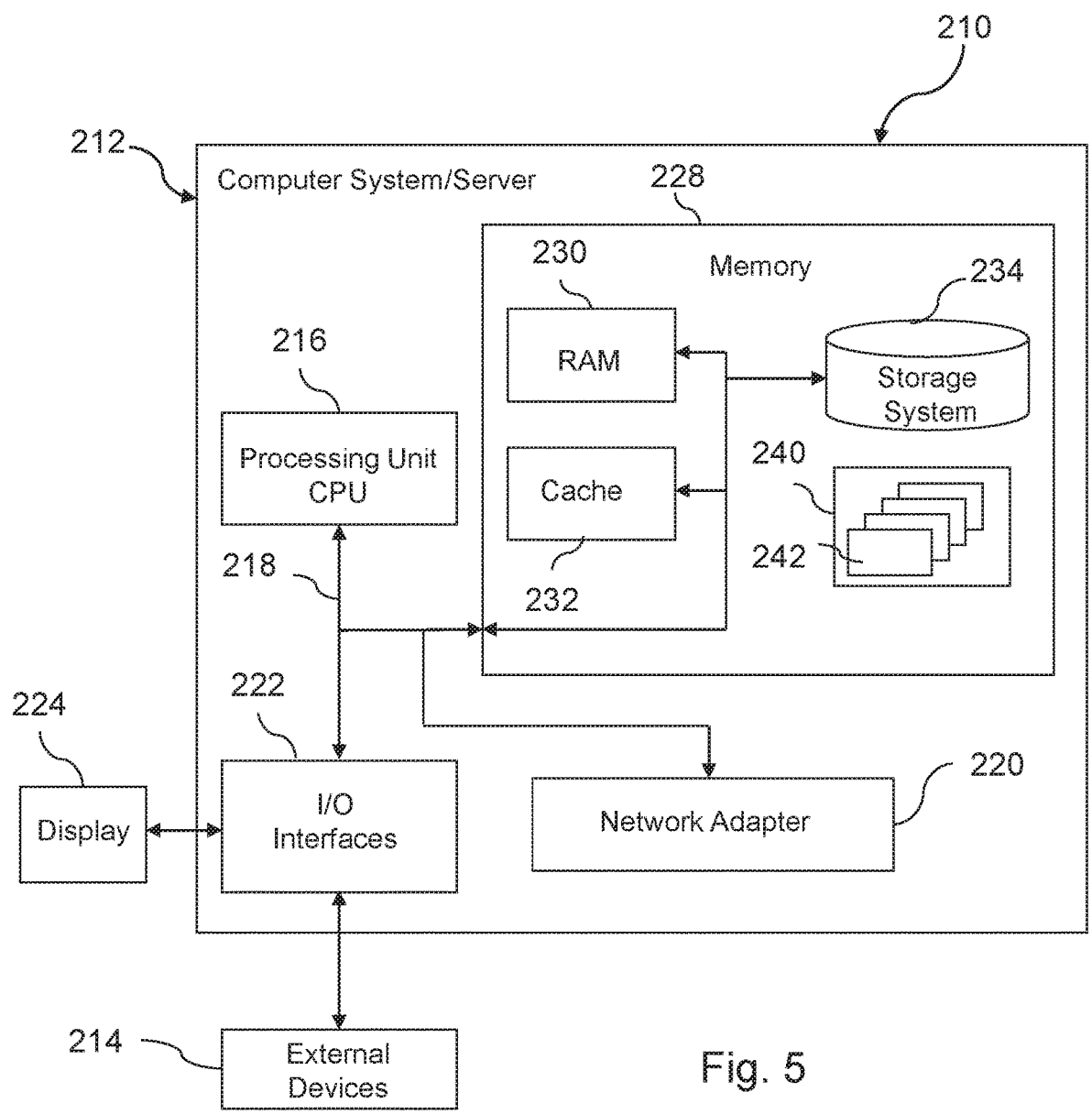
FIG. 5 depicts an example embodiment of a data processing system for executing a method according to the invention.

Referring now to FIG. 5, a schematic of an example of a data processing system 210 is shown. Data processing system 210 is only one example of a suitable data processing system and is not intended to suggest any limitation as to the scope of use, or functionality, of embodiments of the invention described herein. Regardless, data processing system 210 is capable of being implemented and/or performing any of the functionality set forth herein above.

The data processing system 210, with at least one processor unit 216 with at least one processor, may be used for execution of a data processing program 240 including: (i) computer readable program instructions for implementing a security module in a computer system software; (ii) the security module having a secret store for secret data and an interface for operating systems to manage and retrieve the content of the secret store and (iii) the security module stored encrypted with a public key in memory of a computer system 212. In response to an access to the interface, the software may perform the following: (a) switching the processor 16 of the computer system 212 to a secure mode; (b) disabling a write operation of program code and data of the security module from the processor cache 20 to the memory; (c) decrypting the program code and/or data of the security module in the processor cache with a secret key; (d) configuring dynamic address translation to prevent access to the memory outside of the areas used by the security module; (e) executing the program code of the security module with data provided on the interface; (f) encrypting the data in the processor cache with the public key; (g) enabling the write operation of program code and data of the security module from the processor cache to the memory; and (h) switching the processor 16 to a normal operating system mode. The write operation to the memory may be disabled for data tagged with a non-secure flag.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to: (i) personal computer systems; (ii) server computer systems; (iii) thin clients; (iv) thick clients; (v) handheld or laptop devices; (vi) multiprocessor systems; (vii) microprocessor-based systems; (viii) set top boxes; (ix) programmable consumer electronics; (x) network PCs; (xi) minicomputer systems; (xii) mainframe computer systems; and (xiii) distributed cloud computing environments that include any of the above systems or devices, and the like.

Computer system/server 212 may be described in the general context of computer system executable instructions, such as program modules, being executed by a computer system. Generally, program modules may include: (i) routines; (ii) programs: (iii) objects; (iv) components; (v) logic; (vi) data structures, and so on, that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 212 in data processing system 210 is shown in the form of a general-purpose computing device. The components of computer system/server 212 may include, but are not limited to: (i) one or more processors or processing units 216; (ii) a system memory 228; and (iii) a bus 218 that couples various system components including system memory 228 to processor 216.

Bus 218 represents one or more of any of several types of bus structures, including: (i) a memory bus or memory controller; (ii) a peripheral bus; (iii) an accelerated graphics port; and (iv) a processor or local bus using any of a variety of bus architectures. By way of example, and not limitation, such architectures include: (a) Industry Standard Architecture (ISA) bus; (b) Micro Channel Architecture (MCA) bus; (c) Enhanced ISA (EISA) bus; (d) Video Electronics Standards Association (VESA) local bus; and (e) Peripheral Component Interconnect (PCI) bus.

Computer system/server 212 typically includes a variety of computer system readable media. Such media may be any available media that is accessible by computer system/server 212, and it includes: (i) volatile media; (ii) non-volatile media; (iii) removable media; and (iv) non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (for example, at least one) of program modules that are configured to carry out the functions of embodiments of the invention.

Program/utility 240, having a set (at least one) of program modules 242, may be stored: (i) in memory 228, by way of example, and not limitation; (ii) as an Operating System; (iii) as one or more application programs; (iv) as other program modules; and (v) as program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as: (i) a keyboard; (ii) a pointing device; (iii) a display 224; (iv) one or more devices that enable a user to interact with computer system/server 212; and/or (v) any devices (for example, a network card, modem, etc.) that enable computer system/server 212 to communicate with one or more other computing devices. Such communication can occur via Input/Output (I/O) interfaces 222. Still yet, computer system/server 212 can communicate with one or more networks such as: (a) a local area network (LAN); (b) a general wide area network (WAN); and/or (c) a public network (for example, the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: (1) microcode; (2) device drivers; (3) redundant processing units; (4) external disk drive arrays; (5) RAID systems; (6) tape drives; and (7) data archival storage systems.

The present invention may be: (i) a system; (ii) a method; and/or (iii) a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to; (i) an electronic storage device; (ii) a magnetic storage device; (iii) an optical storage device; (iv) an electromagnetic storage device; (v) a semiconductor storage device; or (vi) any suitable combination of the foregoing. A non-exhaustive list of more specific examples of the computer readable storage medium includes the following: (a) a portable computer diskette; (b) a hard disk; (c) a random access memory (RAM); (d) a read-only memory (ROM); (e) an erasable programmable read-only memory (EPROM or Flash memory); (f) a static random access memory (SRAM); (g) a portable compact disc read-only memory (CD-ROM); (h) a digital versatile disk (DVD); (i) a memory stick; (j) a floppy disk; (k) a mechanically encoded device such as punch-cards or raised structures in a groove having instructions recorded thereon; and (1) any suitable combination of the foregoing. A computer readable storage medium, as used herein, is not to be construed as being transitory signals per se, such as: (1) radio waves or other freely propagating electromagnetic waves; (2) electromagnetic waves propagating through a waveguide or other transmission media (for example, light pulses passing through a fiber-optic cable); or (3) electrical signals transmitted through a wire.

Computer readable program instructions described herein can be downloaded to respective computing/processing devices from: (i) a computer readable storage medium; (ii) to an external computer; (iii) an external storage device via a network, for example, the Internet; (iv) a local area network; (v) a wide area network; and/or (vi) a wireless network. The network may include: (a) copper transmission cables; (b) optical transmission fibers; (c) wireless transmission; (d) routers; (e) firewalls; (f) switches; (g) gateway computers; and/or (h) edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be: (i) assembler instructions; (ii) instruction-set-architecture (ISA) instructions; (iii) machine instructions; (iv) machine dependent instructions; (v) microcode; (vi) firmware instructions; (vii) state-setting data; or (viii) either source code or object code written in any combination of one or more programming languages, including an object oriented programming language such as Smalltalk, C++ or the like, and conventional procedural programming languages, such as the "C" programming language or similar programming languages. The computer readable program instructions may execute: (a) entirely on the user's computer; (b) partly on the user's computer; (c) as a stand-alone software package; (d) partly on the user's computer and partly on a remote computer; or (e) entirely on the remote computer or server. In the latter scenario, the remote computer may be connected to the user's computer through any type of network, including: (1) a local area network (LAN); (2) a wide area network (WAN); or (3) the connection may be made to an external computer (for example, through the Internet using an Internet Service Provider). In some embodiments: (I) electronic circuitry including, for example, programmable logic circuitry; (II) field-programmable gate arrays (FPGA) or (III) programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of: (i) methods; (ii) apparatus (systems); and (iii) computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to: (i) a processor of a general purpose computer; (ii) a special purpose computer; or (iii) other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct: (a) a computer; (b) a programmable data processing apparatus; and/or (c) other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto: (i) a computer; (ii) other programmable data processing apparatus; or (iii) other device to cause a series of operational operations to be performed on: (a) the computer; (b) other programmable apparatus or other device to produce a computer implemented process, such that the instructions which execute on the computer; (c) other programmable apparatus; or (d) other device to implement the functions/acts specified in the flowchart and/or block diagram block or blocks.

The flowchart and block diagrams in the Figures illustrate: (i) the architecture; (ii) functionality; and (iii) operation of possible implementations of: (a) systems; (b) methods; and (c) computer program products according to various embodiments of the present invention. In this regard, each block in the flowchart or block diagrams may represent: (1) a module; (2) a segment; or (3) portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for use with a security module including program instructions for providing a secret store in a volatile memory for secret data and an interface for interacting with an operating system, the computer program product comprising:

a machine readable storage device; and computer code stored on the machine readable storage device, with the computer code including instructions for causing a processor(s) set to perform operations including the following:

storing, in a processor cache included in a processor, data constituting the security module in an encrypted form that can be decrypted by a secret key, switching the processor to a secure mode, responsive to the switching to the secure mode, disabling a write operation, with the write operation being an operation that writes the data constituting the security module from the processor cache to a volatile memory, decrypting, in the processor cache, the data constituting the security module with the secret key, configuring dynamic address translation to prevent access to portions of the volatile memory outside of the secret store, receiving data through the interface of the security module, encrypting, by the security module and in the processor cache, the data received through the interface of the security module using a public key, enabling the write operation, and switching the processor to a normal operating system mode;

wherein the processor cache included in the processor includes:

a first level instruction cache included in the processor;

a first level data cache included in the processor;

a second level instruction cache included in the processor; and a second level data cache included in the processor.

2. The computer program product of claim 1 wherein the computer code further includes instructions for causing the processor(s) set to perform the following operations:

disabling the write operation for data tagged with a non-secure flag.

3. The computer program product of claim 1 wherein the interface of the security module is in the form of an application programming interface using a crypto architecture.

4. The computer program product of claim 1 wherein the computer code further includes instructions for causing the processor(s) set to perform the following operations:

receiving, by the processor, an interrupt request;

responsive to the interrupt request, suspending execution of the security module; and subsequent to the encryption of the security module, passing control to an interrupt handling program.

5. The computer program product of claim 4 wherein the computer code further includes instructions for causing the processor(s) set to perform the following operations:

terminating the interrupt request; and responsive to the termination of the interrupt request, restarting the security module.

6. The computer program product of claim 1 wherein the computer code further includes instructions for causing the processor(s) set to perform the following operations:

sharing the security module between a plurality of programs using a semaphore mechanism to serialize access to the secret store of the volatile memory.

7. A computer system for use with a security module including program instructions for providing a secret store in a volatile memory for secret data and an interface for interacting with an operating system, the computer system comprising:

a processor(s) set;

a machine readable storage device; and computer code stored on the machine readable storage device, with the computer code including instructions for causing the processor(s) set to perform operations including the following:

storing, in a processor cache included in a processor, data constituting the security module in an encrypted form that can be decrypted by a secret key, switching the processor to a secure mode, responsive to the switching to the secure mode, disabling a write operation, with the write operation being an operation that writes the data constituting the security module from the processor cache to a volatile memory, decrypting, in the processor cache, the data constituting the security module with the secret key, configuring dynamic address translation to prevent access to portions of the volatile memory outside of the secret store, receiving data through the interface of the security module, encrypting, by the security module and in the processor cache, the data received through the interface of the security module using a public key, enabling the write operation, and switching the processor to a normal operating system mode;

wherein the processor cache included in the processor includes:

a first level instruction cache included in the processor;

a first level data cache included in the processor;

a second level instruction cache included in the processor; and a second level data cache included in the processor.

8. The computer system of claim 7 wherein the computer code further includes instructions for causing the processor(s) set to perform the following operations:

disabling the write operation for data tagged with a non-secure flag.

9. The computer system of claim 7 wherein the interface of the security module is in the form of an application programming interface using a crypto architecture.

10. The computer system of claim 7 wherein the computer code further includes instructions for causing the processor(s) set to perform the following operations:

receiving, by the processor, an interrupt request;

responsive to the interrupt request, suspending execution of the security module; and subsequent to the encryption of the security module, passing control to an interrupt handling program.

11. The computer system of claim 10 wherein the computer code further includes instructions for causing the processor(s) set to perform the following operations:

terminating the interrupt request; and responsive to the termination of the interrupt request, restarting the security module.

* * * * *